March 20, 1962 R. L. COBLE 3,026,210
TRANSPARENT ALUMINA AND METHOD OF PREPARATION
Filed Jan. 3, 1961 4 Sheets-Sheet 1
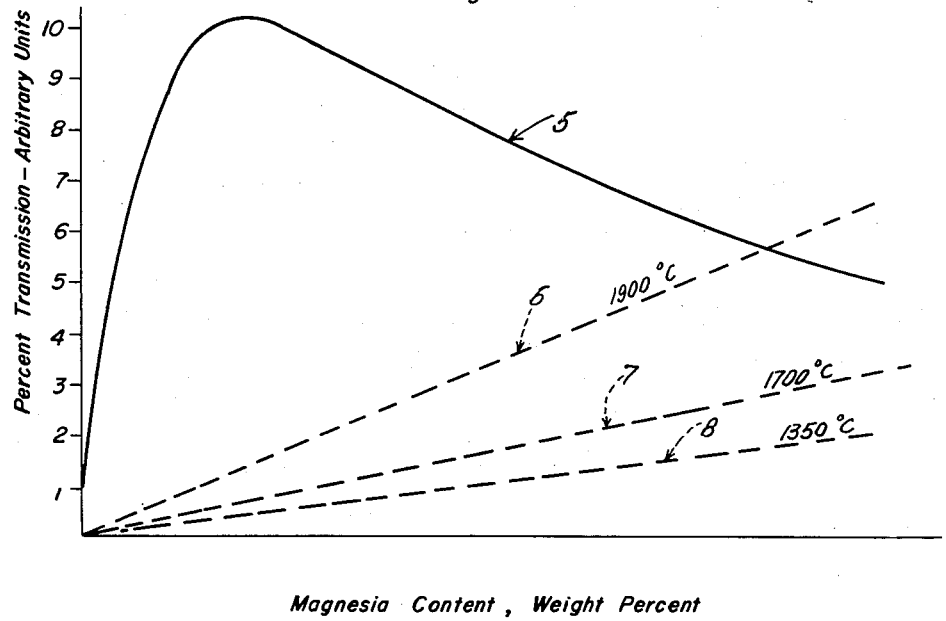
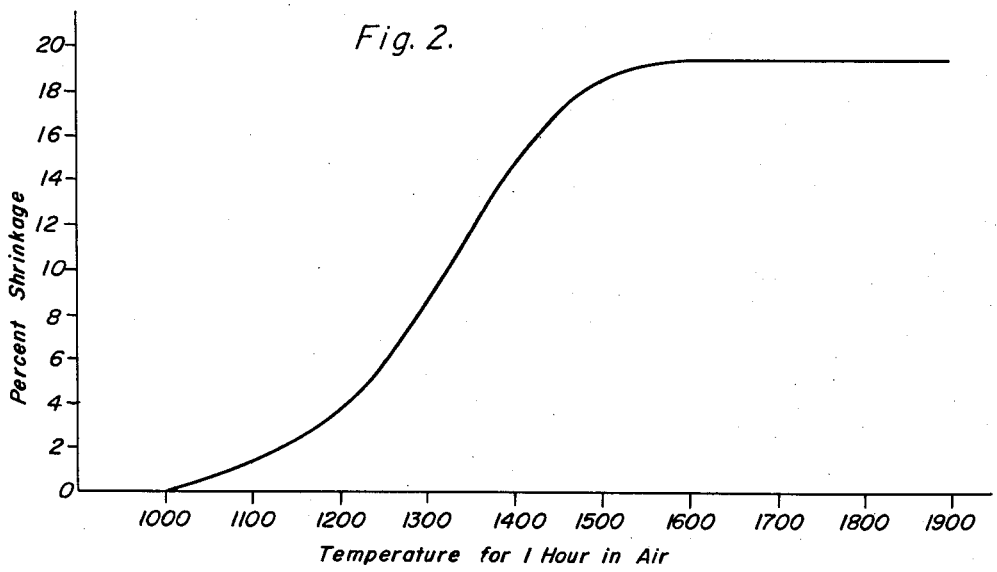
Inventor:
Robert L. Coble,
by Paul A. Frank
His Attorney.

Inventor:
Robert L. Coble,
by Charles ? Watts
His Attorney.

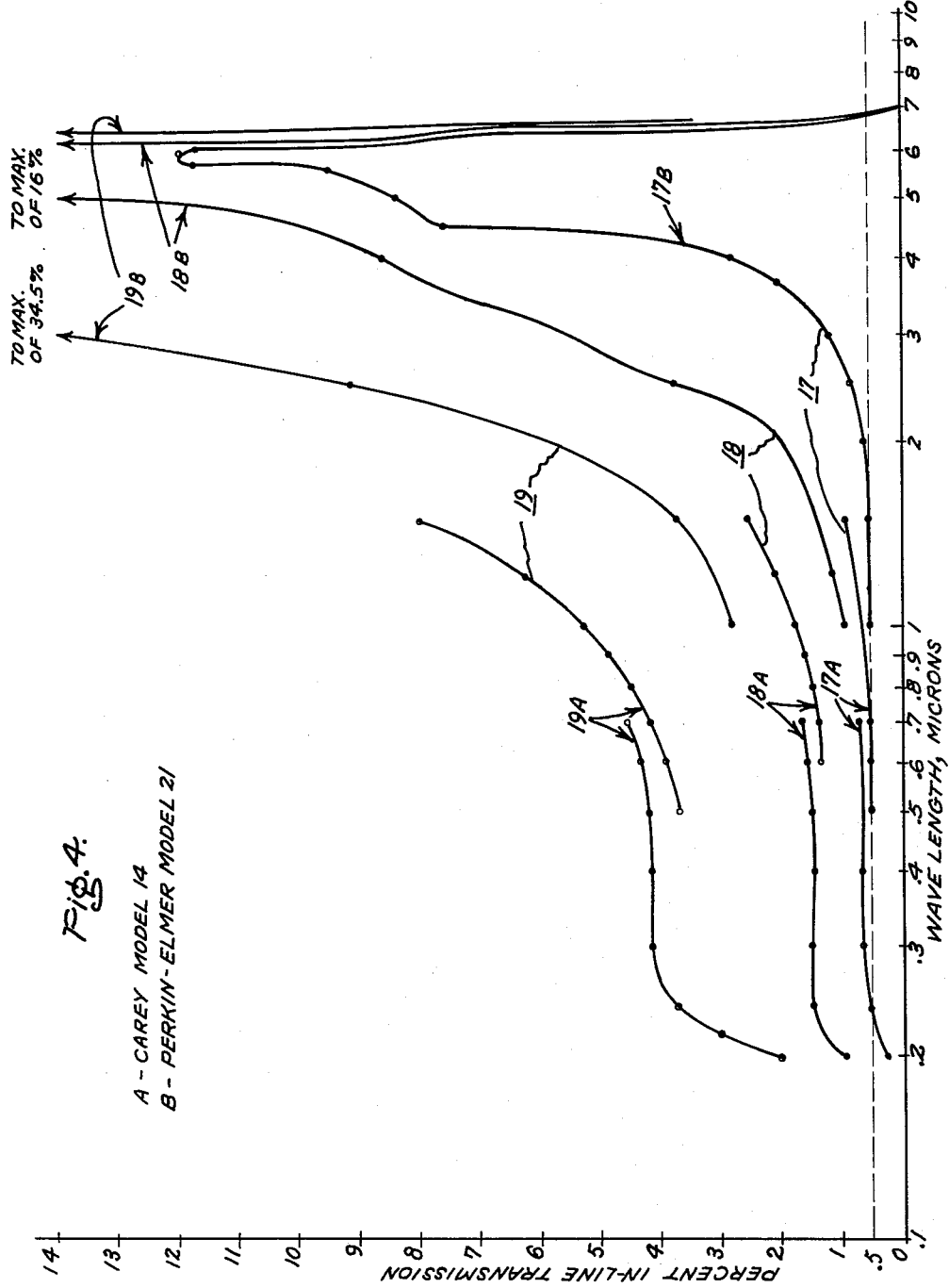

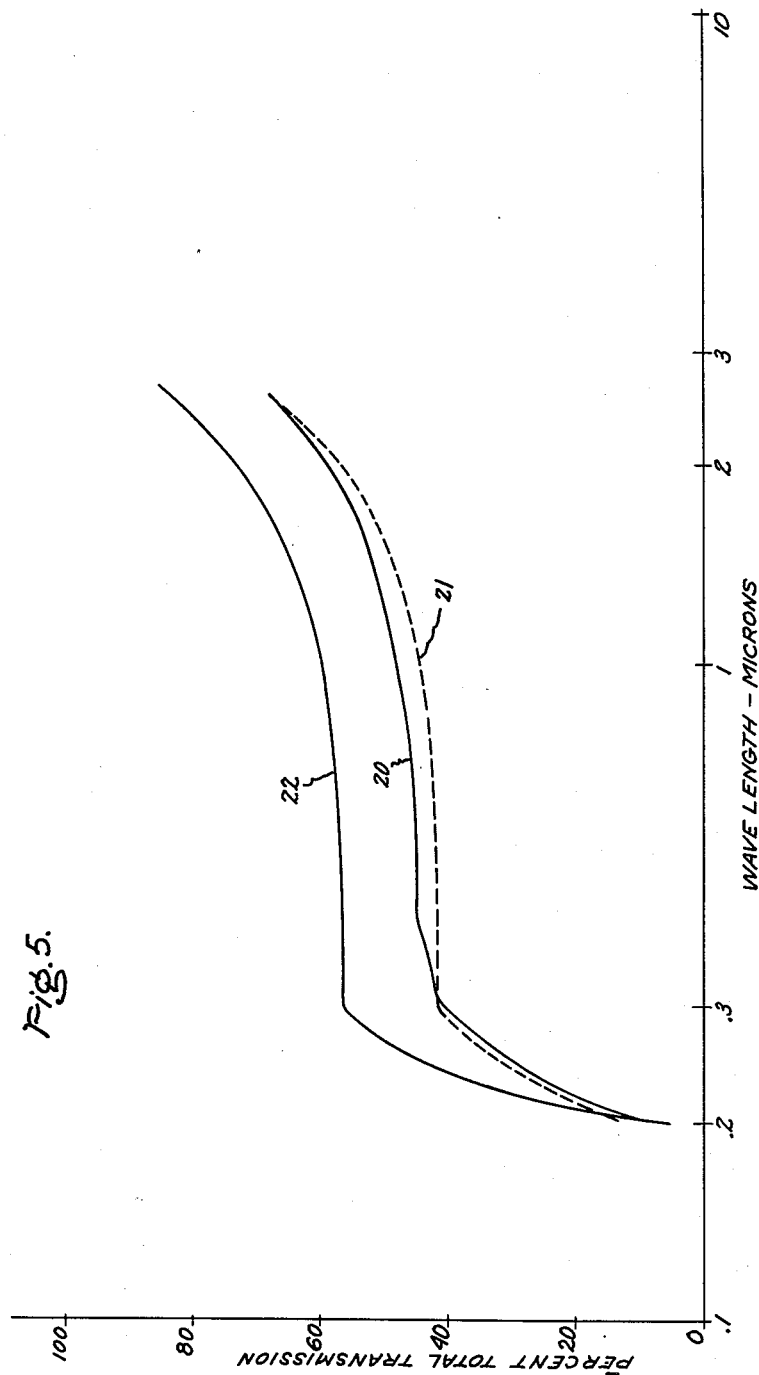

United States Patent Office 3,026,210
Patented Mar. 20, 1962

3,026,210
TRANSPARENT ALUMINA AND METHOD OF PREPARATION
Robert L. Coble, Ballston Lake, N.Y., assignor to General Electric Company, a corporation of New York
Filed Jan. 3, 1961, Ser. No. 80,965
13 Claims. (Cl. 106—39)

This invention relates to ceramic bodies and more particularly to high density polycrystalline bodies of alumina having improved optical transmission properties, compared to the optical transmission properties of known polycrystalline alumina bodies, and to methods for forming such alumina bodies.

This is a continuation-in-part of my copending application filed June 23, 1958, as Serial No. 743,829, now abandoned.

Single crystal bodies of optical sapphire are known to possess highly desirable optical and physical characteristics, such as high strength, high density and a high degree of transparency, as well as the ability to retain these properties, to a large degree, at elevated temperatures. Since the cost of producing single crystal sapphire bodies is comparatively great, they have generally only been used in situations where the requirements were such that no adequate substitute was available, or where cost was not a material factor.

The size and shape of bodies which can be made from single crystals are comparatively limited, while polycrystalline alumina bodies made according to existing practices are of little or no value where radiant energy transmission properties must be considered, due to their inherent opacity. For example, polycrystalline alumina gas tight envelopes for use in high temperature lamps, particularly those of the arc discharge type, would be extremely useful if the alumina were transparent. Such articles cannot be made of single crystals, or at least not in very large sizes, and while an envelope of desired size and shape may be made of alumina particles according to existing practices, it would be of no value in a lamp due to lack of adequate radiant energy transmission. Envelopes of transparent alumina may in certain situations be more useful than, for example, fused-silica envelopes for infra-red sources, because of better intrinsic infra-red transmissivity. Windows for use in high temperature applications, such as furnaces, high speed missiles, etc., might also be advantageously made of transparent, polycrystalline alumina. Thus, transparent polycrystalline alumina bodies may find general use in applications where a substantial degree of transmissivity is needed and where the material must retain its transmissivity and mechanical strength at elevated temperatures.

The attainment of substantial transparency or transmissivity in a high density, polycrystalline body of alumina is dependent upon a number of factors, the principal factors being related as shown by the formula:

$$I/I_0 = (e^{-\alpha d})$$

In this formula, I represents the intensity of transmitted light, $I_0$ the intensity of incident light, $\alpha$ the absorption coefficient and $d$ the thickness of the specimen. Correction for surface reflection or light scattering within the body is omitted, since the in-line transmission is all that needs to be considered for present purposes. The in-line transmission is here defined as the ratio of the amount of radiant energy entering a given sample, within a specified entrance cone, to the amount of emergent radiant energy contained within a cone having the same angular limits as the entrance cone. In this case, the in-line transmission values are based upon cones of radiant energy of 6° and 7°. The values obtained in this manner are felt to be more significant with respect to the transparency of the alumina bodies than total transmission values, due to the fact that total transmission percentages well above 90 can be obtained in a material, for example frosted glass, without achieving any substantial degree of transparency.

The density of the body may be considered as a somewhat more indirect factor affecting the degree of transmissivity, because trapped pores scatter light rays and in effect increase the path length, $d$, through the solid. Therefore, insofar as a greater density reduces the number of pores in the material, it may be assumed that the density has an effect on the transmissivity.

Grain boundary cracks resulting from abnormal or excessively large rates of grain growth act essentially as pores in their effect on transmissivity. That is, boundary cracks, by acting as pores, in effect increase the path length $d$, and reduce the resultant transparency of the body. It will be appreciated that grain growth must be sufficiently suppressed to avoid grain boundary cracking and the resulting reduction in the transmissivity of the alumina body.

A final feature which must be considered is the amount of precipitate, or second phase, which is present in the alumina body. If the percentage is too great, that is, the purity of the alumina too low, excessive diffusion will occur and the in-line transmission will decrease.

A principal object of this invention is to provide a high density, polycrystalline body having sufficient transmissivity to provide for substantial in-line transmission of radiant energy therethrough.

It is another object of this invention to provide a high density, polycrystalline body of alumina capable of in-line transmission per millimeter of body thickness of at least 10 percent of radiant energy of wavelength in the wavelength range from about 0.30 micron to about 6.6 microns.

Another object of this invention is to provide a polycrystalline body of alumina containing small additions of a grain growth retarding agent to prevent grain boundary cracking and thereby reduce scattering of light rays passing through said body.

An additional object of this invention is to provide a process for making polycrystalline alumina bodies capable of in-line transmission per millimeter of body thickness of at least 10 percent of radiant energy of wavelength in the wavelength range from about 0.30 micron to about 6.6 microns.

Another object of this invention is to provide a process for making a polycrystalline body from finely divided alumina in which the major proportion of the alumina has a particle size within the range of from 5 microns to 10 microns and in which the remaining alumina is of submicron size.

Other objects and advantages of this invention will be in part obvious and in part explained by reference to the accompanying drawings and specification.

Briefly stated, the present invention provides high density polycrystalline alumina bodies having in-line transmission of not less than 10 percent per millimeter thickness of radiant energy of wavelength in the wavelength range from 0.30 micron to about 6.6 microns and processes for making such bodies.

In the drawings:

FIG. 1 shows curves relating the transmissivity to percent magnesia added;

FIG. 2 is a curve showing the relationship between firing temperature and the amount of body shrinkage;

FIG. 4 is another chart bearing curves representing the in-line transmission over the wavelength range from 0.2 to 7.0 microns of three of the new alumina bodies of this invention; and FIG. 5 is still another chart bearing curves illustrating the total transmissivity over a substantial wavelength range of each of the three bodies represented by the FIG. 4 curves.

Figure 3:
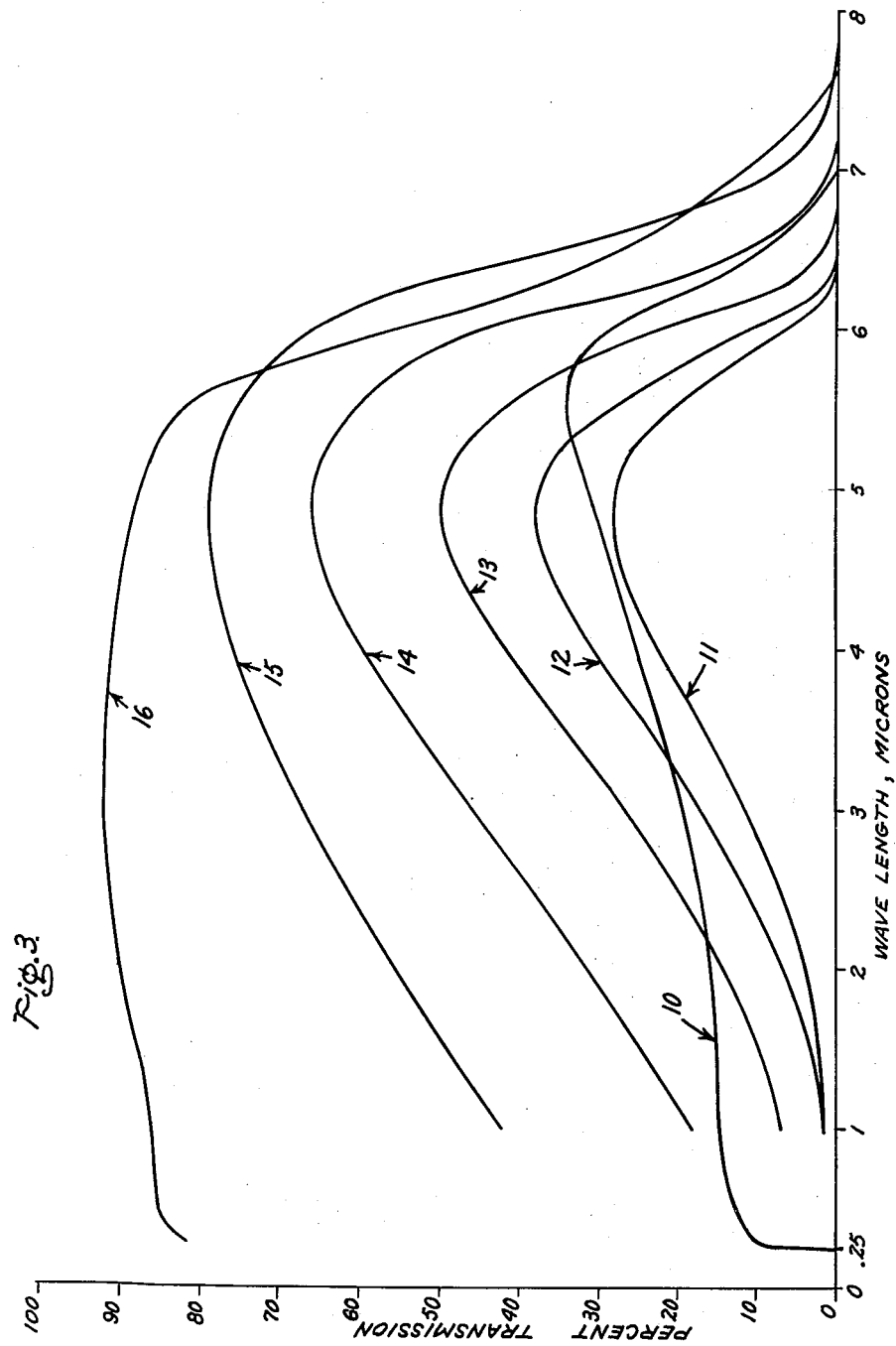
FIG. 3 shows the percent in-line transmissivity of various wavelengths of radiant energy through alumina bodies of varying thickness and through a body made of optical sapphire.

Generally, a method for forming an alumina body having the desired optical characteristics comprises compacting a mixture of finely divided alumina with minor additions of magnesia, and firing the compact for predetermined periods of time at a temperature not lower than about 1700° C. The firing should be carried out in either a vacuum or a hydrogen environment to obtain optimum transmissivity.

More specifically, according to a preferred method of the invention, polycrystalline alumina bodies having the desired optical properties are made by preparing a mixture of high purity finely divided alumina powder with from about 1/16 to about 1/2 weight percent of finely divided magnesia. The alumina may consist entirely of sub-micron size particles having an average size of from about 0.05 to about 0.20 micron, or up to 70 percent alumina of 5 to 10 micron particle size may be mixed with not less than 30 percent of the sub-micron size alumina which acts as a binder or cementing agent for the larger particles. Mixtures containing smaller percentages of 5 to 10 micron size particles and comparatively more sub-micron size particles may be used if desired.

The purity of the alumina may vary somewhat, 99.6 percent pure alumina giving results only slightly lower than those obtained with 99.99 percent pure alumina. In general, however, the purity should not drop below 99 percent and should preferably be as high as possible to reduce the amount of second phase formation which would affect the transparency of the final body through excessive scattering.

It has been found that excessive grain growth must be prevented during the firing or sintering operation to achieve the proper degree of transparency. A large rate of grain growth is undesirable because it results in grain boundary cracking and because many of the included pores become trapped within the grain body and cannot easily diffuse out of the compact. It is believed that the magnesia addition limits grain growth by pinning the grain boundaries and preventing the boundaries from sweeping past included pores and trapping the pores within the grain body. Of course, stress cracking is also alleviated. In this way, alumina mixtures can be sintered at elevated temperatures to achieve the desired degree of transparency.

While the addition of finely divided magnesia to finely divided alumina enables sintering of the alumina into a polycrystalline body having substantial transparency, a reduction in transparency will occur due to the increased formation of a spinel ($MgAl_2O_4$) as a second phase. The spinel acts to decrease in-line transmission by increasing the amount of scattering within the body. Thus, it will be appreciated that there is an optimum range of magnesia addition percentages and the best optical properties will be obtained when the weight percent magnesia added falls within this range.

The relationship between weight percent magnesia addition, spinel formation and relative transparency is shown in FIG. 1 of the drawings. The abscissa shows the magnesia content and the ordinate the relative amounts of in-line transmission through polycrystalline alumina bodies approximately 1.7 mm. thick. Curve 5 indicates that the transparency of an alumina body increases rapidly from 0 percent magnesia and reaches a maximum value, for infrared radiation, when about 1/10 weight percent magnesia is added. Slightly lesser additions, for example on the order of 1/16 percent or less, are generally preferred when visible wavelengths are involved. Additions of amounts of magnesia in excess of 1/10 weight percent cause the transparency to decrease, but at a lesser rate than takes place from 0 to 1/10 percent magnesia. Additions ranging from 1/16 to 1/2 weight percent may be used, with additions of from 1/16 to 1/4 weight percent being preferred in most instances. It is believed that this type of curve results from the fact that small percentages of MgO effectively prevent abnormal grain growth, while trapped pores are eliminated, without causing the formation of an amount of second phase spinel sufficient to reduce transparency. Once the amount of magnesia exceeds about 1/10 percent, the amount of spinel formed becomes great enough to reduce the transparency materially.

Curves 6, 7, and 8 in FIG. 1 illustrate how the percent of spinel formed increases uniformly with an increase in magnesia content and further show the effect of the sintering temperature on the amount of spinel formation. The temperature effects will be discussed more fully later.

While the presence of magnesia during the sintering operation is essential to the production of the new alumina bodies of this invention, it is not necessary to preserve the unique light-transmission characteristics of these bodies in later or continuing sintering or firing operations. Thus, magnesia may be fired out of these bodies to a large extent or completely so that the curves of FIG. 1 and particularly curve 5 are to be interpreted, as indicated above, to mean or designate the magnesia content of the body during the main sintering operation when the new light-transmission characteristic is being established.

Following mixing of the alumina and magnesia, the mixture is compacted at pressures sufficient to produce compacts having green densities not less than 35 percent of the theoretical density of a single crystal of alumina. Generally, the pressure exerted to form a compact of proper green density falls within the range of from about 5 to 50 tons per square inch, depending upon the size of the body to be produced, and a pressure over 5 tons per square inch has been found to be preferred in most normal situations. If a green density of less than 35 percent theoretical density is used, then generally the optical properties do not reach the necessary values.

If the green compact is more than about 3/8 inch in thickness, then it should be prefired in an oxygen-containing atmosphere, such as air, for not less than one hour to achieve optimum transmissivity. Body thicknesses of less than 3/8 inch can be made transparent without the prefiring, although the prefiring can be performed without adversely affecting the transmissivity of the resultant body. The length of prefiring is not thought to be critical, as long as it is in excess of one hour. Longer prefiring times can be used but the transparency of the final body is not materially improved.

Prefiring temperatures should preferably be above 1000° C. and below about 1700° C., the preferred range extending from 1000° C. to 1200° C. Test samples prefired in air at 1150° C. for 1 hour, 1240° C. for 1 week, 1300° C. for 2 days, 1400° C. for 1 hour and one sample which was not prefired at all, showed no appreciable difference in transparency when ultimately placed in final condition by subsequent processing steps.

Referring to FIG. 2 of the drawings, the graph shows the amount of compact shrinkage plotted against increasing temperature, each sample having been prefired in air at some particular temperature for 1 hour. The highest degree of shrinkage takes place between about 1200° C. to 1500° C., whereafter the shrinkage changes very little as the compact density approaches the theoretical maximum. Since transparency can be achieved by prefiring at comparatively low temperatures, it is probably not economically practical to prefire at the higher temperatures. Prefiring within the range of from 1000° C. to 1200° C. gives the compact sufficient strength for machining into the desired shape and the required degree of density is obtained when the compact is given its final sinter.

The final step in preparing a body of transparent alumina consists of sintering the compact at temperatures not lower than 1700° C., and preferably within the range of from 1800° C. to 1950° C. It is felt that the higher temperatures are normally more advantageous in that increased outward diffusion of trapped pores from the body can take place, with attendant increase in optical properties. Generally speaking, the compact may be fired for varying periods of time, depending upon the sintering temperature. At a lower temperature, say 1700° C., a period of 24 hours may be required while at 1900°, the time can be reduced to as little as 6 to 10 hours or less. Of course, longer periods of time at the higher temperatures can be used to produce a body of somewhat better transparency than would be obtained if less time were used. For example, compacts fired at 1900° C. for 1000 minutes (16⅔ hours) were found to have very good transmissivity. This final firing is best carried out in a hydrogen atmosphere to achieve maximum transparency, although heating can also be effected in vacuum and still obtain optical transmission properties on the order of those achieved in hydrogen.

Referring again to curves 6, 7, and 8 of FIG. 1, it is indicated that lower sintering temperatures result in less formation of spinel. However, the amounts of spinel formed from preferred percentage additions of magnesia are not sufficiently different to preclude the use of the higher temperatures, particularly since the higher temperatures produce a degree of transparency which is not attainable through use of the lower temperatures.

Curve 10 of FIG. 3 shows the optical transmission properties of a 0.94 millimeter thick, disk-like alumina body made according to the present process. This article was made by mixing a sufficient amount of finely divided magnesia with sub-micron size alumina (0.05 to 0.2 micron) to result in about ⅛ weight percent magnesia being present in the final mixture. The mixing was effected in a Waring Blendor or mixer having rotating aluminum mixing blades to insure that the magnesia was thoroughly dispersed throughout the alumina, the aluminum blades being used to reduce the possibility of introducing discoloring contaminants into the powder mixture. Obviously, any other suitable mixing apparatus or methods can be used.

The mixed magnesia-alumina powder was then compressed into the disk-like shape at a pressure of about 20 tons per square inch and prefired in air for one hour at 1200° C. Following prefiring, the disk was placed into a molybdenum wound furnace, raised to a temperature of 1700° C., this temperature being held for 100 minutes, and then cooled to room temperature. Refiring to 1900° C. was then effected and the body held at this temperature in a hydrogen atmosphere for 1000 minutes before being cooled to room temperature. The processed body was then prepared for optical measurements by polishing it on opposite sides and the final thickness, as already mentioned, was 0.94 millimeter.

The in-line transmission of the final body exceeded 10 percent from about 0.30 micron to about 6.6 microns and attained a peak value of about 33 percent at 5.5 microns. Additionally, the transmission of radiant energy exceeded 20 percent in the infra-red band from about 3 to 6.3 microns, thereby making the body of particular usefulness in situations where transmittance of intermediate wavelengths of infra-red radiation is important. The preceding measurements were conducted on a Carey Model 14 spectrophotometer produced by Applied Physics Corporation of Monrovia, California, and on a Perkin-Elmer spectrometer equipped with a rock salt prism. The data in the wavelength range up to 1.0 micron was obtained on the Carey machine, while the remaining data through the wavelength range from 1.0 to 6.6 microns was obtained on the Perkin-Elmer machine. Representative transmissivity values, including those mentioned earlier, are presented in the following Table I:

*Table I*

| Wavelength (microns): | Percent in-line transmissivity |
|---|---|
| 0.30 | 11.3 |
| 0.50 | 13.0 |
| 1.00 | 14.0 |
| 2.00 | 17.8 |
| 3.00 | 19.0 |
| 4.00 | 25.2 |
| 5.00 | 27.8 |
| 5.50 | 34.0 |
| 6.00 | 28.5 |
| 7.00 | 0.5 |

The transmissivity values of a second body prepared in the same general manner as the preceding body are indicated by curves 11—15 of FIG. 3. In this case, however, the body was made from a mixture of finely divided alumina powder containing 1/10 weight percent finely divided magnesia. The compacting pressure was 5 tons per square inch and the final body was, once again, disk-shaped, the final thickness being on the order of 4.2 millimeters. Prefiring of the green compact was carried out at 1200° C. for one hour and the prefired compact was given a final firing in hydrogen at 1900° C. for 1000 minutes. After the body had cooled, opposite surfaces were polished and transmission properties evaluated on a Perkin-Elmer spectrophotometer using a rock salt prism. The general construction and operation of this apparatus are shown and described in the Journal of the Optical Society of America, vol. 40, No. 1, pages 29–41, January, and No. 2, pages 93–101, February 1950. The entrance and emergent cones of radiant energy had a 6° spread and the distance between the alumina specimen and the focal point was increased to about 1½ inches, as compared to the one inch normally used.

As curve 11 indicates, the 4.2 millimeter thick body attained a peak transmission value of about 29 percent for radiant energy wavelengths on the order of about 5 microns and exceeded 10 percent transmission of all wavelengths from 3 to 5.9 microns.

Curves 12—14 represent the transmission properties of progressively thinner bodies made from the 4.2 millimeter thick body used in obtaining data for curve 11. To obtain curve 12, the 4.2 millimeter body was reduced in thickness to 3.3 millimeters, repolished and the transmission properties determined. The same procedure was followed in successively reducing the body to thicknesses of 2.2, 1.2 and 0.5 millimeters, in order that the effect of body thickness on transmissivity might be determined.

The 3.3 millimeter body reached a peak transmission of about 38 percent at about a 5 micron wavelength, the 2.2 millimeter body a peak of about 50 percent at about a 5 micron wavelength, the 1.2 millimeter body a peak transmission of about 66 percent, at a 5 micron wavelength, and the 0.5 millimeter body reached a peak transmission of about 79 percent at 4.9 microns. By comparing the peak transmission values as functions of body thickness, it is apparent that the transmissivity increases linearly as the body thickness decreases. Finally, it is noted that the in-line transmission of the 3.3 and 2.2 millimeter bodies exceeds 10 percent for all wavelengths between 2.4 to 6 and 1.5 to 6.2 microns, respectively. The 1.2 millimeter body had about 19 percent transmission at a wavelength of 1 micron, the measurements starting at this value, and exceeded 10 percent up to about 6.6 microns. The 0.5 millimeter body had a 42 percent transmission at 1 micron and exceeded 10 percent up to about 6.9 microns. Additional transmission values are presented in the following Table II:

Table II

| Wavelength (Microns) | Percent In-Line Transmissivity | | | | |
|---|---|---|---|---|---|
| | Body Thickness in Millimeters | | | | |
| | 0.5 | 1.2 | 2.2 | 3.3 | 4.2 |
| 1.0 | 42.0 | 19.0 | 7.0 | 2.0 | 2.0 |
| 2.0 | 55.0 | 32.0 | 15.0 | 7.5 | 4.0 |
| 3.0 | 66.0 | 46.0 | 27.0 | 17.0 | 10.0 |
| 4.0 | 74.5 | 60.0 | 42.0 | 30.0 | 22.0 |
| 5.0 | 79.0 | 66.0 | 50.0 | 38.0 | 29.0 |
| 6.0 | 66.5 | 45.0 | 25.0 | 12.0 | 7.0 |
| 7.0 | 7.0 | 1.0 | 0.0 | 0.0 | 0.0 |

Curve 16 of FIG. 3 shows the in-line transmissivity of a body of optical sapphire 0.94 millimeter thick. By comparing this curve with that of the 0.5 millimeter sintered alumina body (curve 15), it is apparent that the transmissivity of the latter body approaches that of the sapphire. It is therefore possible to substitute a sintered body in place of a sapphire body in many instances where sapphire has heretofore been the only acceptable material. It is also possible to use sintered alumina bodies in situations where somewhat reduced optical transmissivity is acceptable but where the physical characteristics must approach those of sapphire.

In the preceding examples, the raw materials, viz., the finely divided alumina and magnesia powders, were mixed by means of suitable physical agitating apparatus. It is not necessary that this particular means be used, since other methods of mixing the two powders can work as effectively.

For example, one body was made by dissolving magnesium carbonate in hydrochloric acid and forming a magnesium chloride solution. The alumina was in the form of calcined ammonium alum and the magnesium chloride added to the alumina material in a water suspension, to yield 0.2 to 0.5 weight percent magnesia in alumina. In the present instance, 0.5 mole percent magnesia was used, this amount corresponding to about 0.2 weight percent magnesia.

The alumina suspension with magnesium chloride in solution was ground in a polyethylene bottle with alumina grinding balls for about 3 hours, grinding for between 2 to 4 hours being acceptable. Magnesium hydroxide was then precipitated on the alumina by the addition of ammonia until the pH was raised to 7, the suspension being stirred vigorously during precipitation. This suspension was placed in a dryer to remove water until a gel formed and the gel was homogenized by stirring. Drying was completed at 150° C., and a final dried cake pulverized to —100 mesh and then calcined at about 1300° C. for 6 hours. The calcination period may range from about 24 hours at 1200° C. down to about 4 hours at 1350° C., the exact time chosen being more or less dictated by individual preferences.

After calcining, the cake was physically reduced to a finely divided state and the powder pressed at about 50 tons per square inch to form a green compact. The green compact was placed in a molybdenum wound furnace and fired at 1775° C. in a hydrogen atmosphere for 24 hours. The final firing was carried out in air at 1500° C. The time of refiring in air is not critical and can be omitted if desired. After the body had completed the firing cycles, it was polished on opposite sides until its final thickness was on the order of 1/2 millimeter and transmission measurements were taken on the previously mentioned Perkin-Elmer optical measuring device. Representative transmittance values are shown in the following table for the various wavelengths.

Table III

| Wavelength (microns): | Percent in-line transmission |
|---|---|
| 2.0 | 16.5 |
| 3.0 | 21.0 |
| 4.0 | 31.0 |
| 5.0 | 42.0 |
| 5.5 | 46.0 |
| 5.9 | 48.0 |
| 6.0 | 47.5 |
| 6.5 | 38.0 |
| 7.0 | 15.0 |
| 7.5 | 0.0 |

Referring to FIG. 4, percent in-line transmission is plotted against wavelength in microns on a semilog chart for three bodies 17, 18 and 19 of this invention. These bodies, like those represented by curves 10—15 of FIG. 3, were disk-like and were made in accordance with the present novel method. Thus, the finely divided alumina powder described above was mixed with 0.25 weight percent magnesium carbonate (equivalent to 0.1 weight percent magnesia) in finely divided form corresponding to the fine magnesia powder employed as described hereinabove. The resulting essentially uniform mixture was then hydrostatically pressed and prefired, i.e., heated to 1100° C. and maintained at that temperature for one hour. Samples were machined from the sinter bodies and sintered as indicated in Table IV and then tested for in-line transmission and total transmissivity with the results shown on the charts of FIGS. 4 and 5.

Table IV

| Curves | Forming Pressure, p.s.i. | Density as Pressed, Grams/cc. | Sintering | |
|---|---|---|---|---|
| | | | Time, Hours | Temp., ° C. |
| 17 and 20 | 16,000 | 1.75 | 1.5 | 1,800 |
| 18 and 21 | 16,000 | 1.75 | 3.0 | 1,800 |
| 19 and 22 | 5,600 | 1.43 | 4.0 | 1,900 |

Each of the three specimens of Table IV were one millimeter thick and polished on opposite surfaces for spectroscopic examinations which were conducted on a Carey Model 14 machine and a Perkin-Elmer Model 21 machine in gathering the data represented by the points shown on curves 17, 18 and 19 of FIG. 4. These same specimens were examined with the aid of a Beckman DK–1 spectrograph (equipped with a Model 24500 Reflectance Attachment) in gathering the total transmission data illustrated by curves 20, 21 and 22 on the semilog chart of FIG. 5. Accordingly, there is a basis for direct comparison between the in-line transmission and the total transmission of these three specimens, curves 17 and 20, 18 and 21, and 19 and 22, respectively, designating the three specimens, as shown in Table IV.

Curves 17, 18 and 19 are each shown as broken or discontinuous, the three segments of each being identified as A (two segments) and B to show the kind of machine used in making the measurements. The "A" portions of each of these curves were developed from data obtained through the use of a Carey Model 14 spectrophotometer, while the "B" portions depict data obtained by using the Perkin-Elmer Model 21 machine. The break in each "A" portion is attributable to a change in the mode of operating the Carey machine and likewise the break between the "A" and "B" portions reflects the inherent differences between the operations and results of the Carey and the Perkin-Elmer equipment.

In making these tests over the wavelength range from 0.2 micron to 0.7 micron, a lead sulfide detector was employed and light from a hydrogen source was directed through a monochromator to the sample or specimen and then to the detector. Over the range from 0.5 to 1.5 microns, an incandescent light source was used and the light was directed through the sample, through the monochromator and then to the detector, which explains the "break" in the curve and the different transmission values obtained in the overlap region from 0.5 to 0.7 micron.

Using the Perkin-Elmer machine equipped with a rock salt prism and a thermocouple detector and with the aperture at f4.5, light from a tungsten source was directed through a monochromator and then through the test piece or sample and to the detector. This represents the standard practice in the use of this spectrophotometer in making such tests or measurements.

The Beckman DK-1 spectrophotometer was likewise used in the customary manner in gathering the data represented by curves 20, 21 and 22 of FIG. 5. Thus, light from a tungsten source was directed through a monochromator and to the sample and thence to the detector of the machine.

Comparison of FIGS. 4 and 5 reveals that there is some correlation between in-line transmission and total transmission in the new alumina bodies of this invention. This relationship appears to become more pronounced as the in-line transmission quality becomes stronger, particularly in the lower wavelength region from 0.2 micron to 2.7 microns, as exemplified by curves 19 and 22. Accordingly, when the use to be made of these new bodies requires that their total transmission be as high as possible, the choice may generally be made on the basis of their in-line transmission in the visible wavelength range. Thus, the data plotted on these two charts does not indicate any marked tendency for bodies which are inferior to others in total transmission in the shorter wavelengths to become superior to those others when the radiant energy concerned is of substantially longer wavelength. It may be noted, however, that total transmission tends to increase with increases in radiant energy wavelength and that this tendency becomes more marked beginning at wavelengths approximating 1.0 micron.

It will be seen that the present invention has made possible the production of high purity, high density, polycrystalline alumina bodies having a substantial degree of transparency and which have particular application in transmitting radiant energy falling within the visible and infra-red ranges.

Having thus described this invention in full, clear, and concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States:

1. As an article of manufacture, a high density, polycrystalline alumina body consisting essentially of high purity alumina and a small but effective amount up to 0.5 weight percent magnesia present primarily as an alumina-magnesia spinel, said body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within said wavelength range.

2. As an article of manufacture, a high density, polycrystalline alumina body consisting essentially of high purity alumina and a small but effective amount up to 0.5 weight percent magnesia present primarily as an alumina-magnesia spinel, said body having an in-line transmission of not less than 0.5 percent per millimeter thickness of said body of radiant energy of all wavelengths in the wavelength range from about 0.3 micron to about 6.6 microns and having an in-line transmission of not less than 30 percent throughout the wavelength range from about 1.9 microns to about 6.2 microns.

3. As an article of manufacture, a high density, polycrystalline alumina body consisting essentially of high purity alumina and from about 1/16 weight percent to about 1/4 weight percent magnesia present primarily as an alumina-magnesia spinel, said body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within said wavelength range.

4. An article of manufacture as defined in claim 3, wherein about 0.10 weight percent magnesia is present in said body primarily as said alumina-magnesia spinel.

5. As an article of manufacture, a high density, polycrystalline alumina body consisting essentially of high purity alumina, said body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within said wavelength range.

6. As an article of manufacture, a high density, polycrystalline alumina body consisting essentially of high purity alumina, said body having an in-line transmission of not less than 0.5 percent per millimeter thickness of said body of radiant energy of all wavelengths in the wavelength range from about 0.3 micron to about 6.6 microns and having an in-line transmission of not less than 30 percent at all wavelengths within said wavelength range of from about 1.9 microns, to about 6.2 microns.

7. A method for producing a high density alumina body having substantial transparency comprising, preparing a mixture consisting of finely divided alumina powder with a small but effective amount up to 0.5 weight percent of finely divided magnesia powder, pressing the mixture to form a compact having a green density not less than 35 percent of the theoretical density of a single crystal of pure alumina, prefiring the compact in an oxygen-containing atmosphere at a temperature of from about 1000° C. to about 1200° C. for not less than one hour, and firing the prefired compact at from about 1700° C. to 1950° C. in an environment selected from the group consisting of vacuum and hydrogen for a period of time sufficient to produce a body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within the said wavelength range.

8. A method for producing an alumina body as defined in claim 5 wherein the prefired compact is fired in a hydrogen environment.

9. A method for producing a high density alumina body having substantial transparency comprising, preparing a mixture consisting of finely divided alumina powder with a small but effective amount up to 0.5 weight percent of finely divided magnesia powder, pressing the mixture to form a compact not more than about 3/8 inch thick having a green density not less than 35 percent of the theoretical density of a single crystal of pure alumina, and firing the pressed compact at from about 1700° C. to 1950° C. in an environment selected from the group consisting of vacuum and hydrogen for a period of time sufficient to produce a body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within the said wavelength range.

10. A method for producing a high density alumina body having substantial transparency comprising, preparing a mixture consisting of finely divided alumina powder with a small but effective amount up to 0.5 weight percent of finely divided magnesia powder, pressing the mixture to form a compact having a green density not less than 35 percent of the theoretical density of a single crystal of pure alumina, prefiring the compact in an oxygen-containing atmosphere at a temperature of from about 1000° C. to about 1200° C. for not less than one hour, and firing the prefired compact at about 1850° C. to 1950° C. in an environment selected from the group consisting of vacuum and hydrogen to produce an alumina body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within the said wavelength range.

11. A method for producing an alumina body as defined in claim 10 wherein the prefired compact is fired for not less than six hours.

12. A method for producing a high density alumina body having a substantial transparency comprising, preparing a mixture consisting of finely divided alumina powder composed of up to 70 weight percent of 5 to 10 micron size particles and not less than 30 weight percent of sub-micron size particles, introducing a small but effective amount up to 0.5 weight percent of finely divided magnesia powder, pressing the mixture to form a compact having a green density not less than 35 percent of the theoretical density of a single crystal of pure alumina, prefiring the compact in an oxygen-containing atmosphere at from about 1000° C. to about 1200° C. for not less than one hour, and firing the prefired compact at from about 1700° C. to 1950° C. in an environment selected from the group consisting of vacuum and hydrogen for a time sufficient to produce a body having an in-line transmission of not less than 0.5 percent per millimeter thickness of said body of radiant energy of all wavelengths in the wavelength range from about 0.3 micron to about 6.6 microns and having an in-line transmission of not less than 10 percent at some wavelength within the said wavelength range.

13. A method for purifying a polycrystalline alumina body containing small percentages of magnesia-alumina spinel ($MgAl_2O_4$) comprising, heating the alumina body to not less than about 1700° C. in an environment selected from the group consisting of hydrogen and vacuum, and holding the body at the selected purifying temperature for a period of time effecting removal of said spinel by the surrounding environment, the resulting polycrystalline alumina body consisting essentially of high purity alumina having an in-line transmission of not less than 0.5 percent per millimeter thickness of said body of radiant energy of all wavelengths in the wavelength range from about 0.3 micron to about 6.6 microns and having an in-line transmission of not less than about 10 percent at some wavelength within the said wavelength range.

References Cited in the file of this patent

UNITED STATES PATENTS

| 2,310,953 | Heany | Feb. 16, 1943 |
| 2,618,567 | Comstock | Nov. 18, 1952 |

OTHER REFERENCES

Wilder et al.: J. Amer. Ceramic Soc., vol. 38 (February 1955) (pages 67–8).

Cahoon et al.: J. Amer. Ceramic Soc., vol. 39 (October 1956) (pages 342–3).